United States Patent [19]

Hudson

[11] Patent Number: 4,591,430

[45] Date of Patent: May 27, 1986

[54] PROCESS FOR THE DENITROGENATION OF NITROGEN-CONTAINING HYDROCARBON COMPOUNDS

[75] Inventor: Carl W. Hudson, Baton Rouge, La.

[73] Assignee: Exxon Research and Engineering Co., Florham Park, N.J.

[21] Appl. No.: 760,871

[22] Filed: Jul. 31, 1985

Related U.S. Application Data

[63] Continuation-in-part of Ser. No. 611,859, May 18, 1984, abandoned.

[51] Int. Cl.[4] ............................................. C10G 45/04
[52] U.S. Cl. ................................. 208/254 H; 502/328; 502/330; 502/336; 502/338
[58] Field of Search .................. 208/254 H; 502/336, 502/340, 344, 406, 338, 328, 330, 515

[56] References Cited

U.S. PATENT DOCUMENTS

| | | | |
|---|---|---|---|
| 2,455,696 | 12/1948 | Moseman | 502/330 |
| 2,778,805 | 1/1957 | McGrath | 502/330 |
| 3,425,934 | 2/1969 | Jacobson et al. | 208/254 H |
| 3,506,567 | 4/1970 | Barger, Jr. et al. | 208/254 H |
| 3,749,664 | 7/1973 | Mickelson | 208/254 H |
| 4,182,674 | 1/1980 | Wunderlich | 208/254 H |
| 4,329,221 | 5/1982 | Farcasiu et al. | 208/254 H |

FOREIGN PATENT DOCUMENTS 0166940 12/1981 Japan ..................................... 502/336
2032795 5/1980 United Kingdom ................ 502/336

Primary Examiner—John Doll
Assistant Examiner—Anthony McFarlane
Attorney, Agent, or Firm—Llewellyn A. Proctor

[57] ABSTRACT

A process wherein a feed comprising a nitrogen-containing hydrocarbon compound, or compound containing a carbon-nitrogen bond, is contacted in the presence of hydrogen over an iron catalyst at reaction conditions sufficient to cleave said carbon-nitrogen bond and denitrogenate said nitrogen-containing hydrocarbon compound, or compounds. An aromatic heterocyclic nitrogen-containing hydrocarbon, or hydrocarbons, containing at least one aryl carbon-nitrogen bond, or feedstock containing such hydrocarbon, or hydrocarbons, is contacted with hydrogen, preferably over a fused iron catalyst, at reaction conditions sufficient to cleave the aryl carbon-nitrogen bond, or bonds, without significant hydrogenation of the aromatic ring portion of the molecule. The aryl carbon-nitrogen bond, or bonds, are cleaved, and the cleavage site, or sites, healed with hydrogen, without saturation of the aromatic ring portion of the molecule to which the nitrogen atom of the parent compound was bonded.

27 Claims, 2 Drawing Figures

PROCESS FOR THE DENITROGENATION OF NITROGEN-CONTAINING HYDROCARBON COMPOUNDS

RELATED APPLICATIONS

This is a continuation-in-part of Application Ser. No. 611,859, by Carl W. Hudson filed May 18, 1984, now abandoned.

Other related applications are: Application Ser. No. 635,729 by Carl W. Hudson and Glen P. Hamner, filed July 30, 1984, pending, and Application Ser. No. 760,961 by Carl W. Hudson and Glen P. Hamner; Application Ser. No. 760,834 by Carl W. Hudson and Gerald E. Markley; Application Ser. No. 760,894 by Carl W. Hudson and Glen P. Hamner; Application Ser. No. 760,962 by Carl W. Hudson and Glen P. Hamner; and Application Ser. No. 760,835 by Carl W. Hudson and Glen P. Hamner; filed of even date herewith.

BACKGROUND OF THE INVENTION

I. Field of the Invention

This invention relates to a process for the denitrogenation of nitrogen-containing hydrocarbon compounds, or feedstocks containing nitrogen-containing hydrocarbon compounds, via a low hydrogen intensive mechanism. In particular, it relates to a process for the selective denitrogenation of nitrogen-containing hydrocarbons, especially one for the selective cleavage, in the presence of hydrogen, of an aryl carbon-nitrogen bond from an aryl nitrogen-containing hydrocarbon without prior saturation with hydrogen of a non-nitrogen containing aryl moiety which constitutes a portion of said aryl nitrogen-containing hydrocarbon; especially a non-nitrogen containing aryl moiety directly attached to the nitrogen being removed.

II. Background

The denitrogenation of nitrogen-containing hydrocarbon feedstocks, or removal of nitrogen from nitrogen compounds, requires hydrogenation of the nitrogen compounds. The reaction proceeds rapidly with lower boiling feedstocks, but becomes much slower as the boiling range of the feedstock increases. With high boiling range feedstocks, e.g., heavy vacuum gas oils and residua, denitrogenation becomes more difficult, and complete denitrogenation is not obtained even in high severity reactions with the best of presently commercially available catalysts. Hydrodenitrogenation processes require greater consumption of hydrogen as the severity of the process conditions is increased.

There are several reasons which make the hydrodenitrogenation of hydrocarbon feedstocks difficult. For one thing, side reactions occur which often form product nitrogen compounds which are more difficult to denitrogenate than the original nitrogen-containing reactant. Additional hydrogen must then be consumed to achieve a satisfactory level of hydrodenitrogenation. Moreover, the amount of nitrogen in a feedstock increases markedly with increased boiling range. If the rate constant for denitrogenation remained the same, it might be expected that the greater quantities of nitrogen present would not affect the rate of denitrogenation. This, however, is not the case. Apparently the increased size of the non-nitrogen portion of the molecule reduces the rate constant for denitrogenation, perhaps by making contact between the nitrogen-containing compounds and the active sites of the catalyst more difficult.

Processes using conventional catalysts thus require the consumption of excessive amounts of hydrogen, far more hydrogen than required for stoichiometric hydrodenitrogenation of the nitrogen-containing aromatic components of the feed. This is because such reactions generally occur through a network of reaction paths, and the predominant hydrodenitrogenation reaction path in such reactions, if satisfactory levels of nitrogen-removal are to be attained, requires prior hydrogenation of the non-nitrogen containing arene, aryl, or aromatic ring, or rings, particularly those adjacent to, and adjoined via a nuclear or ring carbon atom with the nitrogen atom of the nitrogen-containing heterocyclic ring to be denitrogenated. Moreover, at conditions required for satisfactory nitrogen removal, other non-nitrogen containing aromatic molecules can also be saturated; this further increasing hydrogen consumption. This results in a substantial increase in hydrogen consumption over that which is necessary for stoichiometric nitrogen removal. Conventional hydrodenitrogenation processes are thus plagued by the requirement for excessive hydrogenation prior to the achievement of satisfactory denitrogenation.

In conventional hydrodenitrogenation reactions, as when the hydrodenitrogenation reactions are conducted with conventional nickel-molybdenum or cobalt-molybdenum catalysts, to effect a high level of nitrogen removal extensive hydrogenation is required. Consider, e.g., the following reactions which have been found to occur in the hydrodenitrogenation of model compounds, i.e., (1) the hydrodenitrogenation of aromatic amines or aromatic polyamines, e.g., aniline; (2) the hydrodenitrogenation of $C_4N$ type heterocyclic nitrogen-containing compounds such as pyrrole, indole, or carbazole type compounds, which include an aromatic ring substitutent, or substitutents; (3) the hydrodenitrogenation of heterocyclic aromatic compounds of the $C_5N$ type, such as pyridine, quinoline, or acridine type compounds, which include an aromatic ring substitutent, or substitutents; and (4) the hydrodenitrogenation of carbazole type compounds, e.g., carbazole, to wit:

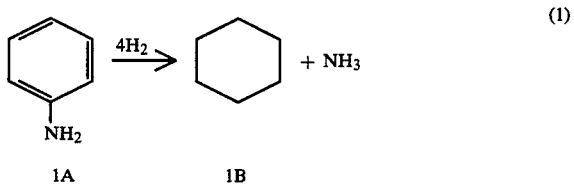

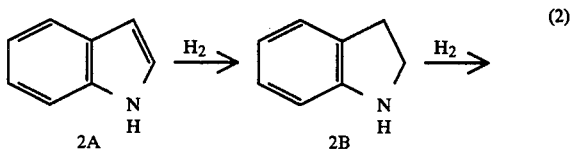

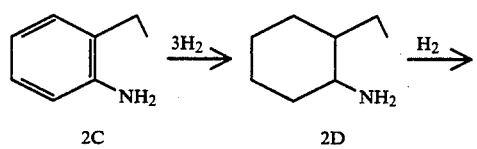

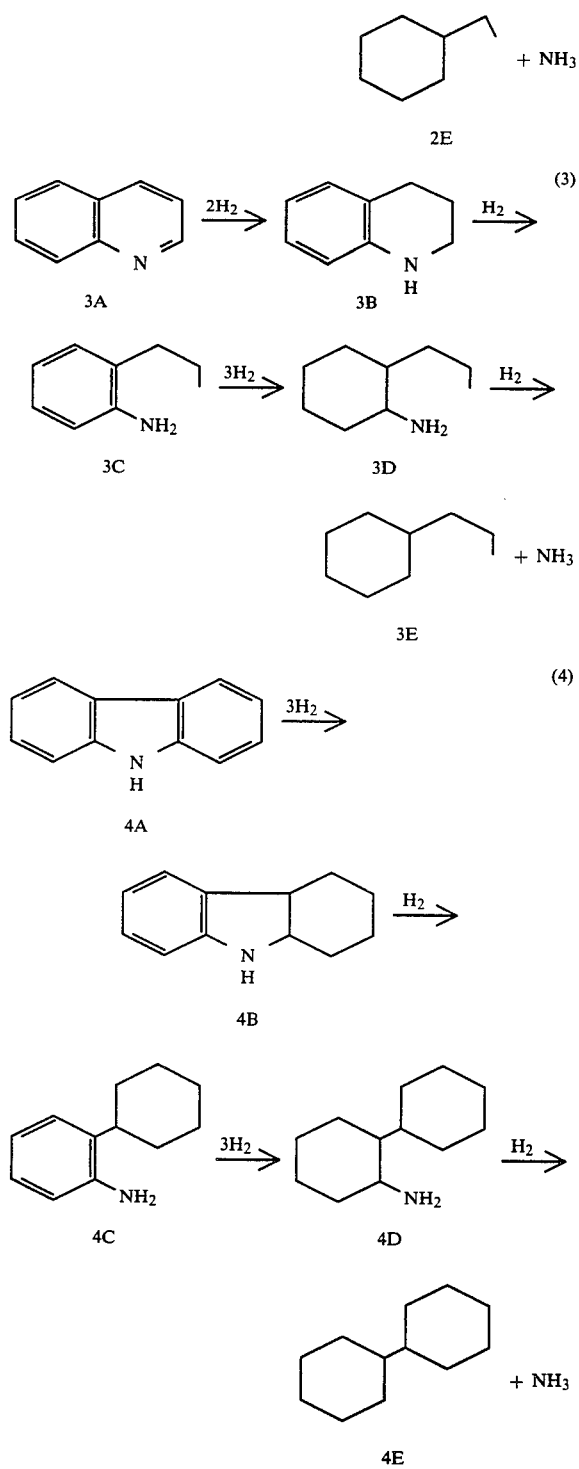

In the hydrodenitrogenation of analine (1A), supra, the aromatic ring is first saturated, and the amino group is then cleaved from the aromatic ring. Cyclohexane (1B) and ammonia are produced, four moles of hydrogen being required; three moles to saturate the aromatic ring and another mole of hydrogen to remove the nitrogen from the ring and form ammonia. In accordance with the series of reactions (2), six moles of hydrogen are required to remove the nitrogen from the ring as ammonia. In the sequence of reactions (3), seven moles of hydrogen are required to remove the nitrogen from the ring. In each set of reactions (2) and (3) the ring containing the nitrogen is first saturated with hydrogen, and thereafter the carbon-nitrogen bond is broken to form the aniline derivative, o-ethylaniline (2C) and o-propylaniline (3C), respectively. Before the second carbon-nitrogen bond is broken, however, the aromatic ring is then saturated to form 1-amino-2-ethylcyclohexane (2D) and 2-propylcycohexylamine (3D), respectively. Thereafter the carbon-nitrogen bonds of these compounds are broken to form ethylcyclohexane (2E) and propylcyclohexane (3E), respectively. In the sequence of reactions (4), eight moles of hydrogen are required to remove the nitrogen from the ring. First, one of the aryl rings is saturated with hydrogen (4A, 4B). Thereafter, the first carbon-nitrogen bond is broken (4C). Next, the last aryl ring is saturated with hydrogen (4D) and thereafter the second carbon-nitrogen bond is broken and nitrogen is then removed from the ring (4D, 4E). Mechanistically, the difficulty associated with all of these reactions is that the aromatic rings must be saturated with hydrogen prior to the final cleavage of the carbon-nitrogen bond which separates the nitrogen atom from the molecule. Thus, at normal denitrogenation conditions hydrogen is used up in producing saturation of aromatic rings which contribute nothing towards denitrogenation, or the removal of nitrogen from nitrogen-containing compounds. Saturation of the non-nitrogen containing aromatic rings does little, if anything, to improve the quality of the product; or, in any event, this is clearly wasteful of hydrogen, and may in some actually decrease the value of the product. Thus, there is a very serious need to provide a novel process which utilizes a less hydrogen intensive mechanism to produce cleavage of carbon-nitrogen bonds.

III. Objects

It is, accordingly, an objective of the present invention to fulfill this need; especially by providing a novel process for the denitrogenation of a nitrogen-containing compound, or compounds, via a non-hydrogen intensive mechanism.

It is, in particular, an object of this invention to provide a novel process for the denitrogenation of nitrogen-containing hydrocarbon feeds, particularly one which effectively denitrogenates such feeds at relatively low temperature and low hydrogen partial pressures.

A more specific object is to provide a process for the selective removal of nitrogen from nitrogen-containing hydrocarbons, or nitrogen-containing hydrocarbon feed components, via a catalytic reaction which removes at relatively low temperatures and low hydrogen partial pressures major amounts of the nitrogen from the nitrogen-containing hydrocarbon, or nitrogen-containing hydrocarbon feed components, by cleavage of carbon-nitrogen bonds, with reaction between the cleaved nitrogen moiety and hydrogen without excessive saturation with hydrogen of the nitrogen-containing hydrocarbon, or nitrogen-containing hydrocarbon feed components, from which the nitrogen has been cleaved.

A yet more specific object is to provide a process for the selective cleavage of an aryl carbon-nitrogen bond of an aryl nitrogen-containing hydrocarbon, or hydrocarbons, or feed containing such hydrocarbon, or hydrocarbons, at relatively low temperatures and low hydrogen partial pressures, without the prior saturation with hydrogen of a non-nitrogen containing aryl moiety constituting a portion of said aryl nitrogen-containing hydrocarbon, or hydrocarbons; especially a non-nitrogen containing aryl moiety directly attached to the nitrogen being removed.

IV. The Invention

These objects and others are achieved in accordance with the present invention embodying a process wherein a feed comprising a nitrogen-containing hydrocarbon compound, or compound containing a carbon-nitrogen bond, is contacted in the presence of hydrogen over a catalyst which contains elemental iron and one or more of an alkali or alkaline-earth metal [i.e., a Group IA or IIA metal (Periodic Table of the Elements, E. H. Sargent & Co., Copyright 1964 Dyna-Slide Co.)], or compound thereof, and preferably additionally a Group IIIA metal, or metal compound, particularly aluminum, or compound thereof, sufficient to selectively cleave said carbon-nitrogen bond and denitrogenate said nitrogen-containing hydrocarbon compound at low temperatures, or temperatures ranging no higher than about 430° C. The process attains its highest usefulness in selectively cleaving the aryl carbon-nitrogen bond of a nitrogenous hydrocarbon compound, or compounds, containing said aryl carbon-nitrogen bond. In a compound, or compounds, characterized by the presence of a nitrogen atom bound via a single bond to a nuclear, or ring carbon atom of an arene, aryl or aromatic ring, cleavage of the carbon-nitrogen bond is produced without significant hydrogen saturation of said arene, aryl or aromatic ring. In the preferred aspects of practicing this invention, a feed comprised of a hydrocarbon compound, or compounds, containing a carbon-nitrogen bond is contacted, with hydrogen, over an alkali or alkaline-earth metal promoted iron catalyst at temperature ranging from about 225° C. to about 430° C., preferably from about 250° C. to about 400° C., more preferably from about 300° C. to about 370° C., and at hydrogen partial pressures ranging from about 0 pounds per square inch gauge (psig) to about 1000 psig, preferably from about 0 psig to about 600 psig, and more preferably from about 0 psig to about 400 psig, sufficient to cleave said carbon-nitrogen bond and denitrogenated said nitrogen-containing hydrocarbon compound, or compounds. In particular, it relates to such process wherein the feed is comprised of an admixture of hydrocarbon compounds, inclusive of one or more of said nitrogen-containing hydrocarbon compounds. More particularly, it relates to such process wherein a feed comprising a hydrocarbon compound, or compounds, the molecule of which is characterized by the presence of a nitrogen atom bound via a single bond to a nuclear, or ring carbon atom of an arene, aryl, or aromatic ring, is contacted in an atmosphere of low pressure hydrogen over said iron catalyst sufficient to cleave said carbon-nitrogen bond without significant hydrogen saturation of the arene, aryl, or aromatic ring attached to said nitrogen being removed.

The alkali or alkaline-earth metal promoted iron catalyst required for use in this invention can be supported or unsupported, but in either instance it is one the catalytic surface of which is constituted essentially of metallic, or elemental iron (Fe°) crystallites about which the alkali or alkaline-earth metals are dispersed, generally as a monolayer of an alkaline oxide or alkaline-earth metal oxide. The elemental iron catalyst containing the alkali or alkaline-earth metal, or compound thereof, is capable of high conversion of aniline (activity), at high selectivity to benzene. For example, a moderately active catalyst, as used pursuant to this invention, is sufficient at 300° C. and 0 psig to convert pure aniline, added with hydrogen in a molar ratio of hydrogen:aniline of 3:1, at a liquid hourly space velocity (LHSV) of 1, at a conversion level of 50 mole percent, or greater, to a liquid product containing 99 mole percent, or greater, benzene. Such combination of high activity, and selectivity, at this low temperature and pressure does not occur with conventional hydrodenitrogenation catalysts. The catalysts employed in conventional hydrodenitrogenation processes are sulfided, and produce hydrodenitrogenation reactions characterized very closely by the network reaction sequence (1), (2), (3), and (4), supra. The catalyst employed in the process of this invention on the other hand is unsulfided, and can function in the presence of sulfur only when a sufficient portion of the catalytic surface of the catalyst is substantially metallic, or elemental iron (Fe°). The formation of sufficiently high concentrations of sulfur at the catalyst surface tends to produce catalyst deactivation via the formation of iron sulfide upon the catalyst surface. Commercial hydrodenitrogenation catalysts are sulfided species, and require high temperature to obtain conversion of a typical hydrocarbon feed, and the selectivity of such catalysts is very low. In the practice of this invention, sulfur or sulfur compounds in concentrations greater than about 5000 ppm, preferably greater than about 2000 ppm, and more preferably greater than about 500 ppm calculated as elemental sulfur based on the weight of the feed, should preferably be avoided. Sulfur introduced into the feed in concentrations greater than these more rapidly deactivate the catalyst by converting a major portion of the metallic, or elemental iron surface of the catalyst to iron sulfide.

In a preferred embodiment of the invention, an arene, aryl, or aromatic heterocyclic nitrogen hydrocarbon, or hydrocarbons, containing at least one aryl carbon-nitrogen bond, or feedstock containing such hydrocarbon, or hydrocarbons, is contacted with hydrogen, over said iron catalyst, preferably over a fused iron catalyst, at reaction conditions sufficient to cleave the aryl carbon-nitrogen bond, or bonds, before significant hydrogenation, and preferably without hydrogenation of the aromatic ring portion of the molecule; particularly the aromatic ring bonded via a ring carbon atom to the nitrogen being removed. Suitably, the aryl carbon-nitrogen bond, or bonds, are cleaved, and the cleavage site, or sites, healed with hydrogen, without saturation of the aromatic ring portion of the molecule by conducting the reaction at temperatures ranging from about 225° C. to about 430° C., preferably from about 250° C. to about 400° C., more preferably from about 300° C. to about 370° C., and under an atmosphere of hydrogen gas or admixture of hydrogen and another gas, or gases within which the hydrogen partial pressure ranges from about 0 psig to about 1000 psig, preferably from about 0 psig to about 600 psig, and more preferably from about 0 psig to about 400 psig. Some positive pressure of hydrogen is necessary in conducting the reaction, though the hydrogen pressure can thus be at atmospheric pressure, or less. The combination of temperature and hydrogen partial pressure are preferably such that a part of the feed, at reaction conditions, is in vapor phase. Temperatures above about 430° C. generally cause cracking of the feed, which can lower liquid yields. At temperatures below about 225° C., on the other hand, the rate of reaction is generally too slow to be practical. Total pressures are not critical, but generally range from about 0 psig to about 2000 psig, preferably from about 0 psig to about 1200 psig. Space velocities range from about 0.01 LHSV to about 20 LHSV, preferably from about 0.1 LHSV to about 5 LHSV.

The present process is useful for the removal of nitrogen from a nitrogen-containing hydrocarbon compound, or compounds. Its highest utility, however, is based on the discovery that nitrogen can be selectively removed, at high levels, from a molecule characterized by the presence of a nitrogen atom bound via a single bond to a nuclear, or ring carbon atom of an aryl group or aromatic ring, with minimal hydrogen saturation, if any, of said aryl group or aromatic ring containing the carbon atom to which the nitrogen is bonded. The mechanism of conventional hydrodenitrogenation requires significant saturation with hydrogen of the unsaturated bonds of the aryl group or aromatic ring portion of the molecule to which the targeted nitrogen atom is bound prior to nitrogen cleavage and separation of nitrogen from the molecule. Unlike conventional hydrodenitrogenation, the present process produces cleavage of the carbon-nitrogen bond, separation of the nitrogen from the molecule, healing with hydrogen of the carbon site from which the nitrogen was broken, and hydrogenation of the nitrogen with minimal hydrogen saturation, if any, of said aryl group or aromatic ring portion of the molecule to which said targeted nitrogen atom is bound. This invention is highly selective, and in its preferred aspects can be further characterized as one wherein at least about 50 weight percent, preferably at least about 75 weight percent, and more preferably from about 90 weight percent to about 100 weight percent, of the nitrogen removed from the parent aromatic nitrogen-containing hydrocarbon compound, or compounds, is the result of denitrogenation via cleavage of said aryl carbon-nitrogen bond, or bonds, with separation of the nitrogen from the molecule and healing with hydrogen of the carbon site of said original feed compound, or compounds, from which the nitrogen was broken, or cleaved, without hydrogen saturation of said aryl or aromatic rings bonded via a nuclear or ring carbon atom to the nitrogen removed from said nitrogen-containing aromatic hydrocarbon compound, or compounds, of the original feed. The selectivity of the process of this invention is sharply contrasted with conventional processes. In the more conventional hydrodenitrogenation reactions, as when the hydrodenitrogenation reactions are conducted to denitrogenate nitrogen-containing aromatic hydrocarbons over conventional nickel-molybdenum or cobalt-molybdenum catalysts, excessive hydrogenation of the aryl or aromatic rings, a nuclear or ring carbon atom of which forms an aryl carbon-nitrogen bond, occurs prior to the cleavage and removal of nitrogen from the molecule.

Whereas there is no desire to be bound by any specific theory of mechanism, it is believed that in hydrodenitrogenating a nitrogen-containing hydrocarbon compound which contains an aryl carbon-nitrogen bond either the iron catalyst, at the conditions of operation, activates the aryl carbon-nitrogen bond sufficiently that it cleaves before hydrogenation of the ring can occur, or the catalyst complexes or ties up the attached aryl or aromatic ring such that hydrogenation of the ring does not compete favorably with aryl carbon-nitrogen bond hydrogenolysis.

The following series of reactions (5), (6), (7), (8) are representative of the low hydrogen intensity reactions which occur in the process of this invention. Reference is also made to reactions (1), (2), (3), (4) to which these reactions can be compared.

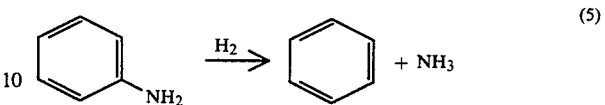

(5)

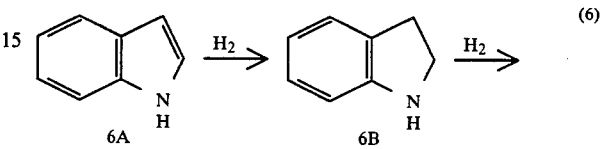

(6)

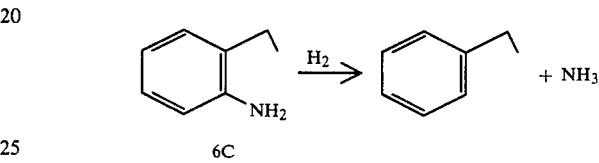

(7)

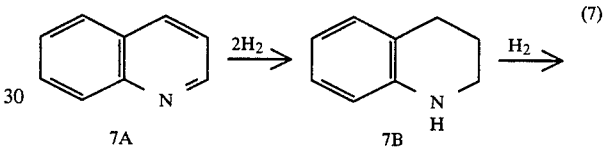

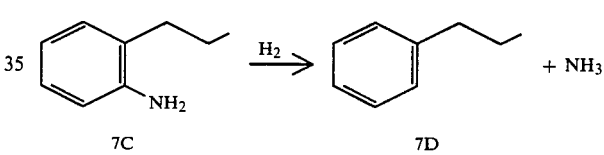

(8)

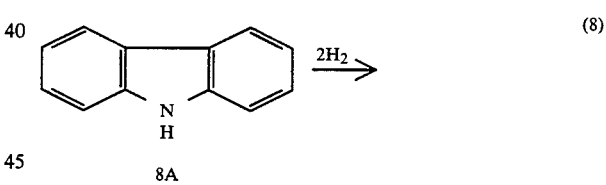

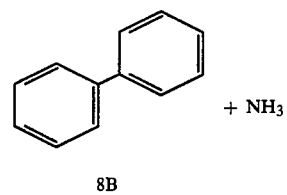

In the hydrodenitrogenation of aniline (5A), the amino group is hydrogenated and cleaved from the aromatic ring, ammonia and benzene (5B) being produced in substantially stoichiometric quantities without saturation of the aromatic ring. Thus, only one mole of hydrogen is required to effect cleavage and removal of nitrogen from the ring whereas, in contrast, four moles of hydrogen are required to form cyclohexane and ammonia in (1), supra.

Indole (2A, 6A) reacts with one mole of hydrogen to form 2,3-dihydroindole (2B, 6B), and quinoline (3A, 7A) reacts with two moles of hydrogen to form 1,2,3,4-tetrahydroquinoline (2B, 6B). After saturation of the nitrogen-containing ring the carbon-nitrogen bond of the 2,3-dihydroindole (2B, 6B) is broken consuming one additional mole of hydrogen to form o-ethylaniline (2C, 6C), and the carbon-nitrogen bond of the 1,2,3,4-tetrahydroquinoline is broken consuming one additional mole of hydrogen to form o-propylaniline (3C, 7C). From this point on, however, the sets of reactions represented by reaction sequences (2) and (3) differ radically from those represented by reaction sequences (6) and (7). In either of reactions (2) and (3) the aryl or aromatic ring of the o-ethylaniline (2C, 6C) or the o-propylaniline (3C, 7C) must be saturated with hydrogen before the second carbon-nitrogen bond is cleaved to remove the nitrogen from the ring. Three moles of hydrogen are thus required to saturate the aromatic ring to form 1-amino-2-ethylcyclohexane (2D) and 2-propylcyclohexylamine (3D) from the o-ethylaniline (2C) and o-propylaniline (3C), respectively. An additional mole of hydrogen is then required to form from these ring-saturated compounds ethylcyclohexane (2E) and propylcyclohexane (3E), respectively. In contrast, ethylbenzene (6D) can be formed directly from o-ethylaniline (6C) and propylbenzene (7D) from o-propylaniline (7C) with the consumption of only one additional mole of hydrogen rather than four. In addition 2,3-dihydroindole (6B) can be directly denitrogenated to ethylbenzene (6D) and 1,2,3,4-tetrahydroquinoline (7B) to propylbenzene (7D).

It will be observed, to summarize, that in the reaction sequence described in (2), supra, a total of six moles of hydrogen are required to remove the nitrogen from the aromatic ring, and that in reaction sequence (6) only three moles of hydrogen are required. In reaction sequence (3) seven moles of hydrogen are required to remove the nitrogen from the aromatic ring, and in reaction sequence (7) only four moles of hydrogen are required. Thus, in either of reaction sequences (2 and 3) or (6 and 7) before the catalyst can effectively break a nuclear carbon-nitrogen bond it must first saturate the rings which contain the nitrogen atom. Having broken the carbon-nitrogen bond between the nitrogen and the saturated ring, the conventional catalyst in accordance with (2) and (3), supra, must then proceed to saturate the remaining ring prior to breaking the second carbon-nitrogen bond. Only then can the nitrogen be removed as ammonia. Not so in accordance with the mechanism provided by the iron catalyst in accordance with the process of this invention. Rather, the aryl carbon-nitrogen bond of the o-ethylaniline (2C) or o-propylaniline (6C) is readily broken without saturation of the ring, one mole of hydrogen being required to heal the hydrogen deficient carbon of the broken carbon chain and further hydrogenate the nitrogen.

Carbazole, a very refractory nitrogen-containing compound, can also be hydrodenitrogenated in accordance with this invention with minimal hydrogen consumption. In reaction sequence (8) supra, only two moles of hydrogen are required to cleave the nitrogen from the two aromatic rings, of carbazole (8A), breakout the nitrogen and form biphenyl (8B) and ammonia. No hydrogen is required to saturate either of the aromatic rings prior to cleavage of the carbon-nitrogen bonds; a saving of six moles of hydrogen. In contrast, a total of eight moles of hydrogen are required to remove nitrogen from carbazole (4A) in accordance with reaction sequence (4) by the use of a conventional catalyst. In accordance with reaction sequence (4), carbazole (4A) is first converted to hexahydrocarbazole (4B), this utilizing three moles of hydrogen to saturate the first aromatic ring. An additional mole of hydrogen is required to form 2-cyclohexylaniline (4C) from hexahydrocarbazole (4B), an additional three moles to form 2-cyclohexyl-cyclohexylamine (4D), and yet an additional mole of hydrogen to form bicyclohexyl (4E) and ammonia.

2-Cyclohexylaniline, it is found by the practice of this invention, can be converted directly to cyclohexyl benzene with the consumption of only one mole of hydrogen, and hexahydrocarbazole can be converted directly to cyclohexylbenzene with the consumption of only two moles of hydrogen.

The catalyst is constituted of elemental iron, modified with one or more alkali or alkaline-earth metals, or compounds thereof, sufficient to produce on contact at reaction conditions selective aryl carbon-nitrogen bond cleavage. The selective aryl carbon-nitrogen bond cleavage reaction occurs over catalysts which contain iron, preferably as the major component, or major metal component. The catalyst may be unsupported or supported, i.e., it may be bulk (unsupported) iron, or iron dispersed upon a support. The unsupported, or bulk iron catalyst is preferred and it may be employed as essentially metallic iron in bulk, or unsupported iron which preferably contains alkali or alkaline-earth metals, or the oxides of such metals, exemplary of which are sodium, potassium, cesium, magnesium, calcium, barium, or the like. The active iron catalyst, when a bulk iron catalyst, is preferably one which contains at least 50 percent elemental iron, more preferably from about 70 percent to about 98 percent elemental iron, based on the weight of the catalyst. The iron catalyst, when a catalyst wherein the iron is distributed or dispersed upon a support, contains at least about 0.1 percent iron (measured as elemental iron), preferably from about 0.1 percent to about 50 percent iron, and more preferably from about 5 percent to about 25 percent iron, based on the total weight of the catalyst, and the supported metallic component, exclusive of the support component, or components, contains at least 50 percent iron (measured as elemental iron), and preferably from about 70 percent to about 98 percent iron.

A bulk or unsupported fused iron catalyst is preferred. The fused iron catalyst is one prepared by heating and melting the iron, thus fusing the iron with an alkali or alkaline-earth metal, or metals, or with an alkali or alkaline-earth metal compound, or compounds, which are generally present in concentrations ranging from about 0.01 percent to about 10 percent, preferably from about 0.2 percent to about 4 percent, based on the total weight of catalyst. Sodium, potassium, cesium, magnesium, calcium, and barium are the preferred alkali or alkaline-earth metals. Aluminum is also a preferred component of the fused iron-alkali or alkaline earth metal catalyst, and it can be present as aluminum metal or an aluminum compound, or compounds, especially as an aluminum oxide. The aluminum metal, or compound thereof, is preferably contained in the catalyst in concentration ranging from about 0.01 percent to about 20 percent, preferably from about 0.5 percent to about 5 percent, calculated as aluminum oxide based on the weight of the catalyst. Other metals may also be used as promoters and/or modifiers which are added to and contained within the catalyst, such metals including rhenium, nickel, cobalt, palladium, platinum, and copper. Such metals may be added to the catalyst alone or admixed one metal with another, or with other metals.

The iron-based catalyst, as suggested, may also be supported; preferably upon an inorganic oxide support. Supports include, but are not limited to, the oxides of aluminum, silicon, boron, phosphorous, titanium, zirconium, calcium, magnesium, barium, and mixtures of these and other components. Other supports may include clays, such as bentonite, zeolites and other alumino-silicate materials, e.g., montmorillionite. Additional supports may be selected from the group of refractory carbides and nitrides of the transition metals of Groups IVB, VB, VIB, VIIB, and Group VIII iron group metals. Alumina, magnesia, and mixtures thereof are preferred supports. The iron-based catalysts are prepared by methods which include precipitation, coprecipitation, impregnation, vapor deposition, and the formation of metal complexes (i.e., metal carbonyl, etc.) and the like. The impregnation of a porous inorganic oxide support, such as alumina, with a solution of an iron salt and an alkali or alkaline-earth metal component, via cocurrent or sequential impregnation, with subsequent drying, calcination and reduction of the supported iron catalyst by contact and treatment of the catalyst with hydrogen or hydrogen and ammonia, or ammonia in admixture with another reducing gas, or gases, has been found to provide a highly active catalyst for the hydrodenitrogenation of nitrogen-containing compounds. Impregnation of the support with iron, or iron and other metal promoters or modifiers, by the incipient wetness technique, or technique wherein the iron nd other metal promoters or modifiers are contained in solution in measured amount and an entire solution absorbed into the support, subsequently dried, calcined, and activated by contact with hydrogen, or hydrogen and ammonia, or ammonia in admixture with another reducing gas has been found particularly satisfactory in preparing a supported catalyst. The supported iron catalyst is promoted or modified with alkali or alkaline-earth metals, or metal oxides such as sodium, potassium, cesium, magnesium, calcium, barium, or the like. The alkali or alkaline-earth metal, or metals, or compounds thereof are added to the catalyst in concentrations ranging from about 0.01 percent to about 10 percent, preferably from about 0.2 percent to about 4 percent, based on the total weight of metal, exclusive of the weight of the support. Sodium, potassium, cesium, magnesium, calcium, and barium are the preferred alkali or alkaline-earth metals. Aluminum, or compound thereof, suitably an oxide, is also as already noted a preferred promoter, or modifier, and it is preferably employed in or contained within the catalyst in concentration ranging from about 0.01 percent to about 20 percent, preferably from about 0.5 percent to about 5 percent, calculated as aluminum oxide ($Al_2O_3$), based on the total weight of the supported component, exclusive of the weight of the support. Rhenium, nickel, cobalt, palladium, platinum, and copper metals, or compounds thereof, can also be added to the catalyst as promoters or modifiers, these metals generally being added to the catalyst in concentrations ranging from about 0.01 percent to about 10 percent, preferably in concentration ranging from about 0.5 percent to about 2.5 percent, based on the weight of the supported component, exclusive of the weight of the support. After impregnation of the support, the metal impregnated support is dried generally at temperatures ranging from about 65° C. to about 280° C., preferably from about 80° C. to about 110° C., in circulating air, vacuum or microwave oven. The calcination is suitably conducted at temperatures ranging from about 300° C. to about 650° C., preferably from about 450° C. to about 550° C.

The iron catalysts can be reduced, and activated by contact with hydrogen, by sequential contact with hydrogen and ammonia, or reduced and activated by contact with an admixture of ammonia and hydrogen or by contact with an admixture of ammonia and another reducing gas or gases. The reducing gas and ammonia can be generated in situ or ex situ. The catalysts are more effectively activated if contacted with a stream of flowing hydrogen, or a stream characterized as an admixture of hydrogen and ammonia, or admixture of ammonia and another reducing gas, or gases. Nitrogen-containing compounds which under pretreat conditions can thermally or reductively decompose to generate ammonia, can also be added to a reducing gas, e.g., hydrogen, and the gaseous mixture contacted with the iron catalysts for the activation thereof. In addition, other pretreatment conditions may be used in combination with reduction in order to modify and/or enhance the catalyst. Treatment with a hydrogen rich blend with some carbon containing gas, e.g., carbon monoxide or carbon dioxide, can be used to introduce carbon to the catalyst.

The catalyst is reactivated, after deactivation, by contact with hydrogen, or by contact with ammonia in admixture with hydrogen, or ammonia in admixture with another reducing gas, or gases. Similarly, the activity-maintenance of the catalyst can sometimes be improved during an operating run by introducing ammonia, or ammonia in admixture with another gas, or gases, with the nitrogen-containing feed. In general, the ammonia is employed in admixture with another gas, or gases, in concentration ranging from about 0.01 percent to about 20 percent, preferably from about 0.2 percent to about 10 percent, based on the volume of the gas.

The the catalyst is activated, pretreated, or reactivated by contact with the reducing gas, or gaseous admixture, at temperatures ranging from about 300° C. to about 600° C., preferably from about 400° C. to about 500° C. Suitable pressures range from about 0 psig to about 2000 psig, preferably from about 0 psig to about 1200 psig. Hydrogen partial pressures generally range from about 0 psig to about 2000 psig, preferably from about 0 psig to about 1200 psig, and more preferably from about 0 psig to about 600 psig. Space velocities generally range from about 100 GHSV to about 10,000 GHSV, preferably from about 1000 GHSV to about 5000 GHSV.

Pure or mixed feeds can be processed in accordance with this invention to hydrodenitrogenate nitrogen-containing compounds. These can include pure aliphatic amines, e.g., primary amines such as methylamine, N-ethylhydroxyamine, n-butylamine, sec-butylamine, n-octylamine, and the like; secondary amines such as diethylamine, dipropylamine, diiso-butylamine, N,N-diethylhydroxyamine, and the like, and tertiary amines such as trimethylamine, trioctylamine and the like; aromatic amines, e.g., aniline, m-toluidine, benzylamine, o-phenylenediamine, 1-naphthylamine, diphenylamine, 3,4-biphenyldiamine, and the like; nitrogen-containing heterocyclic compounds such as 2-aminopyrrole, 1-aminoacridine, and the like. In hydrode-nitrogenating the pure aliphatic compounds the amino group is cleaved; and if there is unsaturation in the molecule, the molecule is generally saturated with hydrogen. In hydrodenitrogenating nitrogen-containing compounds such as quinoline it is found that the nitrogen-containing ring is first hydrogenated, and the carbon-nitrogen bond then cleaved to produce ring opening of the portion of the molecule which contains the nitrogen atom. Thereafter the second carbon-nitrogen bond is cleaved and nitrogen removed without hydrogen saturation of the remaining aromatic ring. Similarly so with such compounds as carbazole and acridine; the nitrogen-containing ring is saturated with hydrogen, the carbon-nitrogen bond is then cleaved, the carbon sites from whereon the nitrogen atom was previously attached are healed with hydrogen, and the nitrogen atom then hydrogenated to form ammonia. In neither instance is there any significant hydrogen saturation of the non-nitrogen containing aromatic rings. The invention finds its greatest utility however, in the treatment of nitrogen-containing feedstocks such as encountered in a refinery environment. Thus, naphthas, middle distillates, inclusive of diesel fuels, jet fuels, various solvents, light gas oil, heavy gas oils and vacuum bottoms and residuals all contain nitrogen in varying concentrations, whether derived from conventional petroleum feeds or non-conventional feedstocks such as tar sands, coal liquids, shale oils, and the like.

The invention will be more fully understood by references to the following demonstrations and examples which present comparative data obtained from runs illustrating its more salient features. All parts are given in terms of weight except as otherwise specified.

Figure 1:
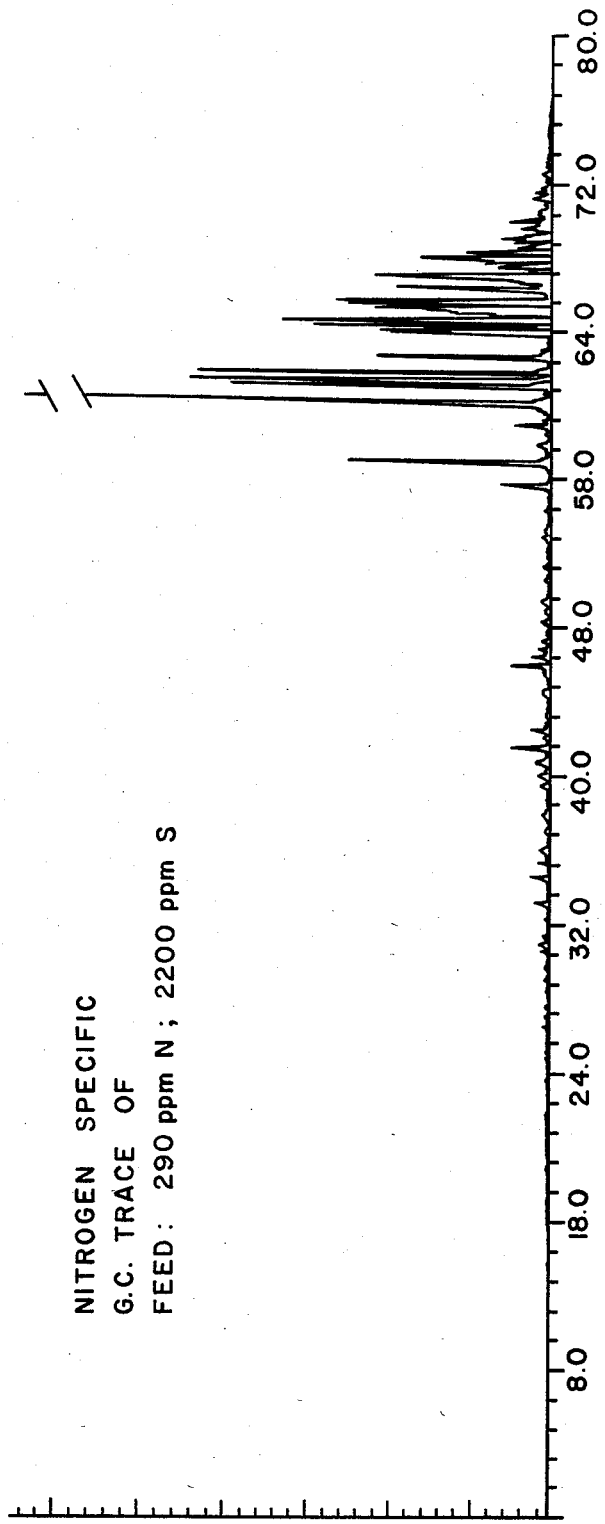
FIGS. 1 and 2 depict the nitrogen content in the hydrocarbon feed and product respectively, as demonstrated in Example 23.

In conducting these runs, a ½" I.D. quartz or stainless steel tubular reactor was employed, the hydrocarbon feed and hydrogen having been cocurrently introduced into the top of the reactor and passed downwardly over a fixed bed of catalyst centered within the reactor. In introducing the hydrocarbon feed, a liquid feed microsyringe pump was employed, the hydrocarbon feed having been pumped and introduced through the needle end of the syringe via a septum inlet, or ⅛" Teflon tubing located in the top of the reactor, while hydrogen was introduced below the septum inlet into the reactor. In some instances when the hydrogen pressure was above atmospheric, the hydrocarbon feed was introduced by pumping same through a tubular inlet located in the side of the reactor, below the hydrogen inlet. An infrared furnace was employed to heat the reactor, and the temperature of the reaction was measured by a thermocouple located within the catalyst bed, and controlled by the use of an automatic temperature controller in operative association with the infrared furnace. The product was passed through a bottom adapter and collected in a vented, cooled flask located near the bottom of the reactor. A back pressure regulator was employed to maintain the desired pressure for runs when pressures above atmospheric were used. The product collected from the reactor was analyzed in a normal manner by gas chromatography (G.C.), or other analytical methods.

EXAMPLES 1-7

A series of tests was conducted at the reaction conditions described in Tables I and II with model compounds characterized as reagent grade chemicals, viz., nitrogen-containing hydrocarbons, obtained from normal suppliers. A 4.5-5 gram portion of a commercially available fused iron catalyst (Katalco 35-4) of 50-150 mesh (Tyler) average particle size, was loaded into the tubular reactor, the catalyst resting atop a glass wool plug supported on three wall indentations made near the middle of the reactor.

The Katalco 35-4 catalyst on an as received basis is constituted of iron oxides modified by controlled amounts of alumina, calcia, potash, silica, and trace impurities. When reduced, the Katalco 35-4 catalyst becomes a highly active stable ammonia synthesis catalyst. The chemical composition and physical characteristics of the Katalco 35-4 fused iron catalyst, on an as received basis, are given as follows:

| I. Chemical Composition (Unreduced), Wt. % | |
|---|---|
| FeO | 24.5 |
| $Fe_2O_3$ | 69.1 |
| Free Fe | Nil |
| Total Fe Oxides | 93.6 |
| $Al_2O_3$ | 2.5 |
| $K_2O$ | 0.8 |
| CaO | 2.0 |
| $SiO_2$ | 0.4 |
| P | Trace |
| Chloride | <10 ppm |
| $Fe^{2+}/Fe^{3+}$ | 0.41 |
| Other minor impurities | Trace V and Ti |
| II. Physical Characteristics | |
| Bulk Density | |
| 165 lb/cu ft oxidized form | |
| 120 lb/cu ft reduced form | |

The fused iron catalyst was charged to the reactor, reduced by contact with hydrogen at 450°-470° C. for 12 to 16 hours, and various model compound feeds then passed with hydrogen over the catalyst bed at the reaction conditions given in Table I.

The products taken from the reactor exit were collected in a flask, the flask being cooled with an admixture of dry ice and methanol. The liquid products were then analyzed by G.C. with the results given in the following Tables I and II.

TABLE I

Model Nitrogen Compounds Denitrogenated Over A Fused Iron Catalyst
Conditions: Temperature 300° C., Pressure 0 psig (14.7 psia)
Space Velocity, V/Hr/V = 1,
Mole Ratio Hydrogen:Nitrogen Compound = 3:1

| Example No. | Feed Nitrogen Compound | Conversion % | Selected Products % Yield |
|---|---|---|---|
| 1 | Aniline | 100 | Benzene (100) |
| 2 | N—Methyl-aniline | 95 | Benzene (88) Toluene (06) |
| 3 | 4-n-Butyl-aniline | 100 | Butylbenzene (95) |

TABLE I-continued

Model Nitrogen Compounds
Denitrogenated Over A Fused Iron Catalyst
Conditions: Temperature 300° C., Pressure 0 psig (14.7 psia)
Space Velocity, V/Hr/V = 1,
Mole Ratio Hydrogen:Nitrogen Compound = 3:1

| Example No. | Feed Nitrogen Compound | Conversion % | Selected Products % Yield |
|---|---|---|---|
| 4 | 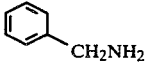 Benzylamine | 100 | Benzene (43) Toluene (54) |
| 5 | C₁₀H₂₁NH₂ Decylamine | 100 | Linear Alkanes (100) |

These data given in Table I clearly show that aromatic nitrogen-containing compounds having an aryl carbon-nitrogen bond, i.e., aniline, N-methylaniline, and 4-n-butylaniline are readily converted to non-nitrogen containing products in high yields. In addition, the reaction provided essentially complete retention of the aromatic ring structure without any observable aromatic ring hydrogenation. The yields of non-nitrogen containing aromatic products too are very high; approaching stoichiometric. Benzylamine and decylamine, primary amines, are converted in stoichiometric quantity to non-nitrogen products, viz., admixtures of benzene and toluene, and linear alkanes, respectively.

TABLE II

Model Nitrogen Compounds
Denitrogenated Over A Reduced Fused Iron Catalyst
Conditions: Temperatures 300° C. and 350° C., respectively,
Pressure 0 psig (14.7 psia)
Space Velocity, V/Hr/V = 1,
Mole Ratio Hydrogen:Nitrogen Compound = 3:1

| Example No. | Feed Nitrogen Compound | Conversion % (Temp.) | Selected Products % Yield |
|---|---|---|---|
| 6 | 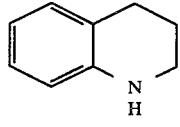 1,2,3,4,-Tetrahydroquinoline | 94 (300° C.) 100 (350° C.) | 2-Propylaniline (68) N—Free Aromatics (26) 2-Propylaniline (25) N—Free Aromatics (69) |
| 7 | 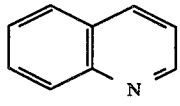 Quinoline | 10 (300° C.) 18 (350° C.) | 2-Propylaniline (2) N—Free Aromatics (6) 2-Propylaniline (4) N—Free Aromatics (13) |

The data given in Table II show the results of the reaction of 1,2,3,4-tetrahydroquinoline and quinoline respectively, over fused iron in the presence of hydrogen. The 1,2,3,4-tetrahydroquinoline (THQ) is converted in high quantity (94% at 300° C.; 100% at 350° C.) to give high yields of products which have either been denitrogenated or have undergone one C—N bond cleavage. At 300° C., the ratio of 2-propylaniline to nitrogen-free aromatics is higher than at 350° C., indicating that the aliphatic C—N bond cleavage (to give 2-propylaniline) is energetically more favorable. However, when sufficient energy is put into the reaction (350° C.), aryl C—N bond cleavage is increased to give predominately denitrogenated products (69%) in which the aromatic ring, which originally contained no nitrogen, has not been hydrogenated. Quinoline, a related but more refractory compound, is also converted and denitrogenated over fused iron, albeit to a lesser extent. This is due to the presence of the N bond in an aromatic ring which displays a formal C=N double bond character. Saturation of this double bond and consequent hydrogenation of the N-containing ring can, and does occur to some extent over fused iron to give THQ as an intermediate. It is this THQ intermediate which then undergoes C—N bond cleavages to give 2-propylaniline and N-free aromatics as in Example 6.

Efficient reduction of the iron by contact of the iron catalyst with a reducing gas is necessary for activation of the catalyst as shown by the following example.

EXAMPLE 8

Two portions of Katalco 35-4 catalyst were reduced for 1 hour, and 14 hours, respectively, by contact with hydrogen at 450° C., at 0 psig hydrogen partial pressure, and GHSV of 1000. A third portion of Katalco 35-4 catalyst was employed, with the two portions of reduced iron catalyst, to conduct three separate hydrodenitrogenation runs employing aniline as a feed at similar reaction conditions. The runs conducted with the reduced iron catalysts are contrasted with the run made with the unreduced portion of Katalco 35-4 catalyst. The reactions were conducted in the three runs at 300° C., a hydrogen partial pressure of 0 psig, and a GHSV of 1000. The results are given in Table III.

TABLE III

Effect of Reduction of Fused Iron Catalysts
In Conducting Hydrodenitrogenation Reactions
Reduction Conditions: 450° C., H₂(GHSV = 1000) at 0 psig
Reaction Conditions: 300° C., H₂: Aniline = 3, LHSV = 1

| Time of Reduction Hours | % Conversion, Aniline to Benzene |
|---|---|
| 0 | <1 |
| 1 | 33 |
| 14 | 100 |

It is readily apparent that efficient reduction of the catalyst is necessary to properly activate the catalyst. It is desirable that a maximum amount of the iron be present as Fe° or iron (0) during the hydrodenitrogenation reactions, and that this state be maintained during the hydrodenitrogenation reactions.

The selectivity of aniline to benzene over an iron catalyst at these high levels, particularly the conversion of aniline to benzene in essentially stoichiometric quantities, is indeed surprising. Such levels of conversion are not believed possible at these conditions in processes which utilize other kinds of catalysts, e.g., nickel-molybdenum or cobalt-molybdenum catalysts.

The following example compares runs made at mild conditions with an iron catalyst as employed in this invention, and commercially available nickel-molybdenum and cobalt-molybdenum catalysts, respectively. This example demonstrates the striking selectivity advantage of the iron catalyst as used in the process of this invention for selectively removing nitrogen of an aryl C—N bond at low severity without prior saturation of the aromatic ring.

EXAMPLE 9

A Katalco 35-4 fused iron catalyst in bulk form, a commercial nickel-molybdenum/alumina catalyst and a commercial cobalt-molybdenum/alumina catalyst, all ground to 50–150 mesh particle size, were pretreated at conditions found optimum for achieving maximum conversion of aniline to benzene. These conditions are described in the second column of Table IV. Aniline was reacted over the pretreated Katalco 35-4 fused iron catalyst at 300° C., a $H_2$:aniline molar ratio of 3:1; at 0 psig hydrogen partial pressure and an LHSV=1. Aniline was also reacted over the nickel-molybdenum and cobalt-molybdenum catalysts at these same conditions, with the results given in the following Table IV.

TABLE IV

Conversion of Aniline to Benzene Over Commercial Catalysts Following Reductive Treatment
Reaction Conditions: 300° C., $H_2$: Aniline = 3, 0 psig Hydrogen, LHSV = 1

| Catalyst | Pretreatment | % Conversion Aniline to Benzene |
|---|---|---|
| Fused Iron, Katalco 35-4 | $H_2$ (1 Atm.), 450° C./14 Hours | 100 |
| Ni—Mo/$\gamma$Al$_2$O$_3$ | $H_2$ (1 Atm.), 450° C./14 Hours | 5 |
| Ni—Mo/$\gamma$Al$_2$O$_3$ | 10% $H_2S/H_2$ (1 Atm.), 350° C./1 Hour | 4 |
| Co—Mo/$\gamma$Al$_2$O$_3$ | $H_2$ (1 Atm.); 450° C./14 Hours | 4 |

With the reduced fused iron catalyst, aniline was quantitatively converted to benzene and ammonia. Under the same pretreatment and reaction conditions, the CoMo/Al$_2$O$_3$ and the NiMo/Al$_2$O$_3$ catalysts gave only 4–5% denitrogenation. Also, the use of a sulfiding procedure for the NiMo/Al$_2$O$_3$ catalyst, a method known in the art to improve hydrodenitrogenation activity, did not improve the conversion of aniline at these relatively mild, low hydrogen pressure reaction conditions. If, on the other hand, one wanted to push conversion of aniline to nitrogen-free products over a NiMo/Al$_2$O$_3$ or CoMo/Al$_2$O$_3$ catalyst, higher hydrogen pressure would be necessary. This would give high conversion of aniline but the major product would likely be cyclohexane, not benzene. This further demonstrates the utility of the present invention in removing nitrogen in a selective manner by cleavage of the aryl C—N bond without prior saturation of the aromatic ring. Quite obviously, the fused iron catalyst employed in the process of this invention is far more effective and selective for denitrogenating nitrogen-containing aromatic hydrocarbons than the conventional CoMo/Al$_2$O$_3$ and NiMo/Al$_2$O$_3$ catalysts, especially at the preferred low pressure reaction conditions.

The following examples demonstrate various other iron catalysts to which promoters or modifiers have been added.

EXAMPLES 10–15

In preparation for conducting this series of runs, a number of promoted iron catalysts were charged to the reactors and contacted with hydrogen, or an admixture of hydrogen and ammonia (19:1 molar ratio $H_2$:$NH_3$) for periods sufficient to reduce and activate the catalysts.

The amount of catalysts used in this series was based on a constant volume, 2.25 mL, with the weight of catalyst thus depending on the inherent density. Once each catalyst was reduced and activated, the reactants, hydrogen and aniline, were fed to the reactor (molar ratio 3:1, respectively). The reaction conditions were 1 atmosphere (0 psig) $H_2$ pressure, LHSV=1, at the temperatures given in Table V sufficient to cleave the aryl carbon-nitrogen bond and form benzene. Reference is made to Table V.

The identity of the catalyst is given in the first column, the catalyst pretreat conditions in the second column, and the percent benzene formed in the third column. The temperature at which the reaction was conducted is given in the fourth column opposite the % benzene that was formed in the reaction.

Table V

Selective Denitrogenation of Aniline With Other Promoted Iron Catalysts

| Catalyst Identity | Pretreat Conditions | % Benzene In Product | Temperature of Reaction, °C. |
|---|---|---|---|
| 15% Fe/Al$_2$O$_3$ [Fe$_2$(NO$_3$)$_3$] with 75 wppm Na and 28 wppm K | $H_2$-450°/ 16 Hours | 35 | 300 |
| Coprecipitated Iron-Aluminum-Calcium Catalyst (Ratio 83:16:1) with ~1.5% K (as K$_2$CO$_3$) | 5% NH$_3$/H$_2$ 470° C./ 2 Hours | 48 | 300 |
| 15% Fe/Al$_2$O$_3$ [Fe(NO$_3$)$_3$] + 1% KOH | $H_2$-470°/ 18 Hours | 85 | 300 |
| 15% Fe/MgO—Al$_2$O$_3$ (3:1) [Fe(NO$_3$)$_3$] | $H_2$-350°, 400°, 450°/ 0.5 Hours each | 95 | 300 |
| Raney-Type Iron (50:50 Fe—Al Alloy Leached in NaOH Solution)[1] | 5% NH$_3$—H$_2$ 470° C./ 2 Hours | 98–99 | 300 |

[1]Test run with 100–300 mesh particles at a liquid hourly space velocity of 3.9

It has been found that the presence of ammonia during the catalyst pretreatment stage improves catalyst performance, as demonstrated by the following example.

EXAMPLE 16

Portions (2.25 mL) of fused iron catalyst were contacted with either hydrogen, hydrogen followed by ammonia, or an admixture of hydrogen and ammonia (19:1 molar ratio) for periods sufficient to activate the iron catalyst. The reactants, hydrogen and aniline, (3:1 molar ratio, respectively) were fed to the different reactors containing the activated catalysts. The reaction conditions were ~280° C., one atmosphere (0 psig) $H_2$, and LHSV's ranging from 2 to 4. The liquid products from these reactors were collected in flasks cooled with an admixture of dry ice and methanol and analyzed by gas chromatography. The results are given in Table VI, to which reference is made. The first column gives the conditions of the pretreatment stage while the second column shows the value of multiplying the % benzene in the product times the space velocity (LHSV), this value being indicative of the rate of reaction.

TABLE VI

The Presence of Ammonia During the
Pretreatment (Reduction/Activation) Stage
Improves the Denitrogenation Performance
of Fused Iron Reaction Conditions: 1 Atmosphere $H_2$ (0 psig);
$H_2$:aniline = 3; ~280° C.;
LHSV = 2-4

| Pretreatment Conditions | % Benzene in Product × Space Velocity (V/H/V) @ 1 Hr. Reaction Time |
|---|---|
| $H_2$-450° C./16 Hrs. | 121 |
| $H_2$-450° C./16 Hrs.; $NH_3$-450° C./1 Hr. | 177 |
| 5% $NH_3/H_2$ blend - 470° C./2.5 Hrs. | 232 |

These results clearly show the activity advantage found when ammonia is present in the pretreatment stage. These data further illustrate a preferred method of pretreatment, that of reduction/activation at high temperature (400°-500° C.) in a flowing stream comprised of an admixture of hydrogen and ammonia.

In addition, the time period of reduction with an admixture of hydrogen and ammonia in the pretreatment stage directly affects fused iron catalyst activity and performance.

EXAMPLE 17

Portions of Katalco 35-4 catalyst were contacted with an ammonia and hydrogen admixture (1:19 molar ratio $NH_3:H_2$) at 470° C. for periods of 1 hour, 2 hours, 3 hours, 4.3 hours, and 16 hours, respectively, and the portions of catalyst reduced.

Independent runs were then made, aniline and hydrogen in a 3:1 molar ratio of $H_2:C_6H_6NH_2$ being passed over each catalyst at 270° C., 0 psig partial pressure of hydrogen, and at an LHSV=4. The results are given in Table VII.

TABLE VII

Determination of Optimum Time Period of
Reduction For Fused Iron Catalysts With 5% $NH_3/H_2$ Blend
270° C., 0 psig $H_2$, $H_2:C_6H_5NH_2$ = 3, LHSV = 4

| Time of Reduction | % Aniline Conversion (After 1 Hour) |
|---|---|
| 1 | 18 |
| 2 | 30 |
| 3 | 52 |
| 4.3 | 42 |
| 16 | 16 |

The data show that the optimum period of treatment is about three hours. By the end of the three hour period, the catalyst was essentially completely reduced, and ammonia activated. Beyond this period, however, the reduced catalyst exhibits lower activity. This is believed caused by excessive nitriding of the catalyst. Thus, bulk $Fe_xN$ is believed formed and debits catalyst activity (bulk iron nitride has been shown to be a relatively ineffective catalyst). The activity of the nitrided catalyst can be restored however by high temperature treatment with hydrogen.

The present process differs radically from conventional hydrodenitrogenation processes which are hydrogen intensive in that they require extensive hydrogen saturation of non-nitrogen containing aryl or aromatic rings prior to nitrogen cleavage and removal, whereas in contrast the present process is non-hydrogen intensive in that it can cleave an aryl carbon-nitrogen bond, or bonds, from an aryl or aromatic nitrogen-containing hydrocarbon without hydrogen saturation of non-nitrogen containing aryl or aromatic rings, particularly non-nitrogen containing aryl or aromatic rings directly attached to the nitrogen being removed. The process is not only applicable to pure compounds, but it is also directly applicable for use in processing complex admixtures of nitrogen-containing hydrocarbon feedstocks such as are required to be treated for conversion in modern refinery units. Such feedstocks are, for example, those used directly or modified by known techniques for use in hydrocarbon conversion reactions for improving the octane number of gasoline or converting relatively heavy hydrocarbons to light, lower boiling hydrocarbons, and including converting hydrocarbons by hydrogenation or dehydrogenation to saturate or unsaturate, in whole or in part, various species of molecular hydrocarbons. Feedstocks which can be processed are, e.g., those now used in hydrocarbon conversion processes such as aromatization, isomerization, hydroisomerization, cracking, hydrocracking, polymerization, alkylation, dealkylation, hydrogenation, dehydrogenation, desulfurization, denitrogenation, and reforming. Such feedstocks can be derived from petroleum, or from synthetic sources, e.g., coal liquids, shale oil, tar sands, and the like. The following examples exemplify the processing of such feeds.

The example immediately following demonstrates the removal of nitrogen from a hydrotreated petroleum derived light cat cycle oil (LCCO) over an iron catalyst.

EXAMPLE 18

Two different LCCO feedstocks were treated in two separate runs. Both feedstocks were 400°-700° F. boiling fractions which had been hydrofined at low pressure conditions. Feedstock A was the product of a 650° F., 325 psig, treat gas rate (TGR)=2000 SCF/B $H_2$, LHSV=0.25 run and contained about 150 ppm nitrogen and 300 ppm sulfur. Feedstock B was hydrofined at 700° F., 500 psig, TGR=2000 SCF/B $H_2$, and LHSV=1, and it contained about 170 ppm nitrogen and 200 ppm sulfur.

A Katalco 35-4 fused iron catalyst (10.0 mL; 24.42 g.) was charged to a reactor, and reduced and activated by contact with a flowing stream comprised of an admixture of hydrogen and ammonia (19:1 molar ratio $H_2:NH_3$) at 470° C. for a period of 2.5 hours. Feedstock A was then reacted over this catalyst at 350° C., 100 psig hydrogen partial pressure, TGR=6000 and LHSV=0.65. At intervals measured in hours, the whole product was analyzed to determine the amount of nitrogen and sulfur, respectively, in the product. The percent nitrogen removed during denitrogenation was thus determined. The results are given in Table VIII.

TABLE VIII

Selective Denitrogenation of LCCO Feedstock A
350° C., 100 psig, TGR = 6000 SCF/B $H_2$, LHSV = 0.65

| Run Time Hours | Nitrogen In Product, ppm | Sulfur In Product, ppm | % Nitrogen Removal |
|---|---|---|---|
| 0.00 | 169 | 210 | — |
| 0.50 | <5 | — | 97 |
| 1.75 | <5 | — | 97 |
| 3.60 | <5 | — | 97 |
| 12.10 | <5 | — | 97 |
| 21.40 | 8 | 120 | 95 |
| 25.40 | <5 | 110 | 97 |
| 35.40 | 10 | 110 | 94 |
| 45.40 | <5 | 120 | 97 |

TABLE VIII-continued

Selective Denitrogenation of LCCO Feedstock A
350° C., 100 psig, TGR = 6000 SCF/B H₂, LHSV = 0.65

| Run Time Hours | Nitrogen In Product, ppm | Sulfur In Product, ppm | % Nitrogen Removal |
|---|---|---|---|
| 48.50 | <5 | — | 97 |
| 57.70 | 20 | 260 | 88 |
| 67.20 | 16 | — | 91 |

Feedstock B was reacted over a (10 mL; 24.78 g.) portion of a Katalco 35-4 fused iron catalyst which was activated in the same manner as described above. Through 40.67 hours the conditions were 350° C., 100 psig pressure, TGR=6000 SCF/B H₂, and LHSV=0.65; and from 40.67 hours through 66.33 hours the conditions were changed to 350° C., 100 psig pressure, TGR=3000 SCF/B H₂, and LHSV=B 0.8, with the results given in Table IX.

TABLE IX

Selective Denitrogenation of LCCO Feedstock B
0-40.67 Hours: 350° C., 100 psig, TGR = 6000 SCF/B H₂, and LHSV = 0.65
40.67-66.33 Hours: 350° C., 100 psig, TGR = 3000 SCF/B H₂, and LHSV = 0.8

| Run Time Hours, | Nitrogen In Product, ppm | Sulfur In Product, ppm | % Nitrogen Removal |
|---|---|---|---|
| 0.00 | 146 | 310 | 00 |
| 0.00 | 14 | — | 90 |
| 0.53 | 3 | — | 98 |
| 20.00 | 4 | 170 | 97 |
| 38.33 | 15 | 230 | 90 |
| 40.67 | 27 | 210 | 82 |
| 50.67 | 44 | 220 | 70 |
| 62.33 | 47 | 230 | 68 |
| 66.33 | 45 | 240 | 69 |

These data clearly show that good nitrogen removal is obtained, even in the presence of 200-300 ppm levels of sulfur; and this is particularly so in the denitrogenation of Feedstock A. Although some desulfurization is observed, most of the sulfur passes through the catalyst bed without causing significant deactivation.

The following example demonstrates the process in its use in denitrogenating a shale oil fraction; but particularly its use as a nitrogen removal finishing step for the clean-up of a previously hydrotreated shale oil fraction. Most of the nitrogen in shale oil has been found to be of the type wherein aryl carbon-nitrogen bonds must be cleaved in order to obtain nitrogen removal.

EXAMPLE 19

A full range Australian shale oil was dewatered and departiculated, and then distilled to remove light and heavy ends. The resulting 400°-925° F. (204.5° C.-496° C.) boiling range hydrocarbon oil was hydrotreated over a standard Ni-Mo/Al₂O₃ catalyst at 650° F. (343° C.); 2000 psig H₂; LHSV=0.8-0.9; TGR=6000-7000 SCF/b to produce a product oil which was further distilled into various fractions. The fraction boiling between 530° F. (276.7° C.) and 650° F. (343.3° C.) was found to contain 1770 ppm nitrogen and about 100 ppm sulfur. This hydrocarbon fraction was then contacted in a reactor over a Katalco 35-4 fused iron catalyst, which was activated by reduction at 0 psig by contact with a 5% NH₃/H₂ admixture flowing at 400-600 cc/min. at 470° C. for a period of 2 to 2.5 hours. Nitrogen removal from the oil was then effected by passing the oil over the activated fused iron catalyst at 300° C. or 350° C. and an LHSV of 1.9 or 0.5 with the results as shown in the following Table X.

TABLE X

Denitrogenation of a Hydrotreated, 530-650° F. Australian Shale Oil Fraction at Atmospheric Pressure in Flowing Hydrogen

| Temperature (°C.) | LHSV | Nitrogen In Product, ppm | % Nitrogen Removal |
|---|---|---|---|
| 300 | 1.9 | 1410 | 20 |
| 350 | 1.9 | 1385 | 22 |
| 350 | 0.5 | 940 | 47 |

The following example shows that greater amounts of nitrogen can be removed from a hydrotreated shale oil fraction, or fraction containing even smaller concentrations of sulfur.

EXAMPLE 20

Two runs were made to remove nitrogen from a 400°-925° C. Colorado shale oil fraction, which had been hydro-treated (700° F.; 2000 psig; TGR=7000; LHSV=0.5) over a Ni-Mo/Al₂O₃ catalyst to contain 512 wppm nitrogen and 45 wppm sulfur. The reactions were conducted over 4.2 mL (10.0 g.) portions of activated Katalco 35-4 fused iron catalysts. In Run 20-1 the fused iron catalyst was reduced in H₂-470° C./16 hrs. In Run 20-2 the catalyst received a preferred reduction in 5% NH₃/H₂-470° C./2.5 hrs. The results are shown in Table XI.

TABLE XI

Nitrogen Removal From a Hydrotreated 400-925° C. Colorado Shale Oil Fraction Over Activated Fused Iron Catalysts
350° C., 250 psig, LHSV = 1.25, ~9500 SCF/B H₂

| Run | Product Sulfur, ppm | Product Nitrogen, ppm | % Nitrogen Removed |
|---|---|---|---|
| 20-1 | 1 | 87 | 83 |
| 20-2 | <1 | 32 | 94 |

These data clearly show that nitrogen removal at low pressure can be accomplished. The benefit of NH₃/H₂ reduction, earlier shown with model compounds, can also be observed in the hydrodenitrogenation of a complex hydrocarbon feed.

Reference is made to the following example demonstrating hydrodenitrogenation and regeneration runs. These data show that up to 95 percent, or more; of the nitrogen can be removed from a shale oil feed, and that the hyrodenitrogenation activity of the catalyst can be recovered by regeneration of the deactivated catalyst; or its activity sustained by on-stream regeneration of the catalyst.

EXAMPLE 21

Two runs, simulating first and second stages, were made to remove nitrogen from a Colorado shale oil fraction. First a full range Colorado shale oil was dewatered and departiculated, and then distilled to remove light and heavy ends. The resulting 400°-925° F. (204.5° C.-496° C.) boiling range oil was hydrotreated over a conventional sulfided Ni-Mo/Al₂O₃ catalyst at 675° F. (357.2° C.); 2000 psig H₂; LHSV=0.5-1.0; TGR=7000 SCF/B, to produce a product oil which was further distilled into various fractions. The fraction boiling between 400° F. and 650° F. (204.5° C.-343.3° C.) was found to contain 2200 ppm nitrogen and 10-20 ppm sulfur. This hydrocarbon fraction was then contacted in a reactor with a 10.0 mL charge of Katalco 35-4 fused iron catalyst which was activated by reduction at 0 psig in a flowing stream of 5% $NH_3$ in $H_2$ at 470° C. for a period of 2.5-3.0 hrs. Nitrogen removal from the oil was then effected at the following initial conditions: 350° C.; 110 psig $H_2$; TGR=6700 SCF/B; LHSV=0.50. The results from this first stage run are shown in Table XII, and the process changes made during the run are noted in the following text.

TABLE XII

First Stage Denitrogenation of 400-650° F.
(204.5° C.-343.3° C.) Colorado Shale Oil Fraction
Initial Conditions: 350° C.; 110 psig $H_2$; TGR = 6700 SCF/B; LHSV = 0.50

| Run Time, Days | Nitrogen in Product, ppm | % Nitrogen Removal |
|---|---|---|
| 0.00 | 2200 | — |
| 0.84 | 434 | 80 |
| 1.22 | 499 | 77 |
| 2.25 | 830 | 62 |
| 3.25 | 1044 | 53 |
| 3.94 | 1127 | 49 |
| 4.98 | 1226 | 44 |
| 6.29 | 1259 | 43 |
| 7.24 | 1545 | 30 |
| 7.92 | 1857 | 16 |
| 8.41 | 1904 | 14 |
| 8.91 | 1981 | 10 |
| 9.41 | 1962 | 11 |
| 9.91 | 1998 | 9 |
| 10.41 | 2022 | 8 |
| 10.91 | 2048 | 7 |
| 11.60 | 2143 | 3 |
| 12.60 | 2158 | 1 |
| 13.42 | 2053 | 7 |
| 13.98 | 1910 | 13 |
| 14.58 | 893 | 59 |
| 14.92 | 450 | 80 |
| 15.43 | 367 | 83 |

This first stage denitrogenation run exhibited good activity for nitrogen removal (80%) at the start-of-run. However, gradual deactivation of the catalyst leads to a steady decline in nitrogen removal.

After 7.25 days on oil, the conditions were changed by increasing the $H_2$ pressure to 255 psig. However, nitrogen removal activity continued to decline between 7.92 and 10.41 days on oil.

After 10.5 days on oil, the conditions were further changed by decreasing the treat gas rate (TGR) to 3300 SCF/B $H_2$.

Not surprisingly, the denitrogenation activity continued to decline until after 13.5 days on oil a regeneration sequence was performed. The hydrocarbon feed was stopped and the reactor allowed to purge at reaction conditions for 1 hour. At this point the treat gas was switched to a blend of 5% $NH_3$ in $H_2$ (at the original 6700 SCF/B gas rate) and the reactor temperature was raised to 470° C. over a period of about one hour. The catalyst was held at this temperature for one hour in the presence of the 5% $NH_3$ in $H_2$ blend gas and then the temperature was lowered, over a period of about one hour, back to process temperature, 350° C. After the catalyst bed had cooled to below 400° C., the 5% $NH_3/H_2$ blend gas was switched back to $H_2$ only at the 6700 SCF/B rate. This whole regeneration procedure was done at 255 psig total pressure on the reactor.

Following the regeneration sequence, the feed pump was restarted and the process conditions set at 350° C., 255 psig $H_2$, TGR=6700 SCF/B, and LHSV=0.50. Note that nitrogen removal activity was recovered by regeneration, and the level of nitrogen remaining in the product steadily decreased from 13.98 days through 15.43 days an oil when the experiment was terminated.

These results demonstrate the ability of fused iron to remove nitrogen from a representative shale oil mixture. These results also demonstrate the utility of the regeneration sequence which can be used to restore part or all of the original denitrogenation activity of the fused iron catalyst.

The product of the first stage run was composited to provide an oil containing about 1700 ppm nitrogen and <10 ppm sulfur. This composite was then used as the feed for the second stage experiment in which a similar reactor was charged with another 10.0 mL portion of a Katalco 35-4 fused iron catalyst. In this case, the catalyst was activated with the 5% $NH_3/H_2$ blend, as above, except that the pressure was maintained at 250 psig instead of one atmosphere (0 psig). The composited feed was then contacted with the activated fused iron catalyst at the initial conditions of 350° C., 255 psig $H_2$, TGR=7700 SCF/B, and LHSV=0.44. The results of this second stage experiment are shown in Table XIII, and the process condition changes made during the run are noted in the following text.

TABLE XIII

Second Stage Denitrogenation of 400-650° F.
(204.5° C-343.3° C.) Colorado Shale Oil Fraction
Initial Conditions: 350° C., 255 psig $H_2$, TGR = 7700 SCF/B, LHSV = 0.44

| Run Time, Days | Nitrogen in Product ppm | % Nitrogen Removal |
|---|---|---|
| 0.0 | 1700 | — |
| 0.30 | 365 | 78.5 |
| 0.82 | 163 | 90.4 |
| 1.32 | 158 | 90.7 |
| 1.82 | 151 | 91.1 |
| 2.45 | 161 | 90.5 |
| 3.34 | 192 | 88.7 |
| 4.22 | 288 | 83.1 |
| 4.82 | 327 | 80.8 |
| 5.32 | 338 | 80.1 |
| 5.82 | 327 | 80.8 |
| 6.32 | 322 | 81.1 |
| 6.82 | 467 | 72.5 |
| 7.32 | 621 | 63.5 |
| 7.81 | 482 | 71.6 |
| 8.42 | 430 | 74.7 |
| 9.56 | 104 | 93.9 |
| 10.46 | 82 | 95.2 |
| 11.22 | 86 | 94.9 |
| 11.83 | 86 | 94.9 |
| 12.32 | 79 | 95.4 |
| 12.70 | 73 | 95.7 |

The second stage run exhibited good activity for nitrogen removal (90%) following the first 15-17 hours on oil. A much slower rate of deactivation, compared to the first stage run, was observed which led to an increase in product nitrogen level from about 150 ppm to about 320 ppm after 6.32 days on oil.

At this point, viz., after 6.32 days on oil, the treat gas was changed; while employing a 255°-260 psig total pressure on the reactor. The treat gas was switched from $H_2$ only to a 5% $NH_3$ in $H_2$ blend, at essentially the same process conditions and total treat gas rate. This 5% $NH_3/H_2$ blend appeared to cause an initial deactivation which was then reversed as product nitrogen levels began to return to lower values at 8.42 days on oil. The use of an admixture of ammonia and hydrogen demonstrates that such gas mixtures can be used concurrently with the feed hydrodenitrogenation step. Such conditions can be useful during runs since it is known that catalyst activation with ammonia-hydrogen mixtures promotes higher activity and catalyst regeneration. The same or similar $NH_3/H_2$ mixtures can be used to recover lost activity or improve activity maintenance during an operating run.

Regeneration of the catalyst was then begun. After about 8.5 days on oil, the hydrocarbon feed to the reactor was stopped and the reactor allowed to purge at reaction conditions for about one hour whereby no liquid product was being discharged. The reactor was then heated to 470° C. over a period of about one hour in the presence of the 5% $NH_3/H_2$ blend (at the same 7700 SCF/B gas rate). The catalyst was held at 470° C. for one hour and then cooled back to reaction temperature, 350° C., over a period of about one hour. After the catalyst bed had cooled to below 400° C., the 5% $NH_3/H_2$ blend gas was switched back to $H_2$ only at the same 7700 SCF/B gas rate.

Following the regeneration sequence, feed was again introduced into the reactor and the run continued at the initial process conditions of 350° C., 255 psig $H_2$, TGR=7700 SCF/B, and LHSV=0.44. Once again, nitrogen removal activity was recovered, and even improved, by the regeneration sequence. The level of nitrogen in the product steadily decreased from 104 ppm at day 9.56 to less than 80 ppm after 12.70 days on oil when the run was terminated.

These runs clearly demonstrate the ability of an activated fused iron catalyst to remove nitrogen from a complex hydrocarbon feed, viz., up to 95%, or more, of the nitrogen, from a representative shale oil mixture. Moreover, after deactivation, catalyst activity can be recovered, and even improved, by the regeneration sequence. The very high level of nitrogen removal and the stable operation between days 9.56 and 12.70 in the second stage hydrodenitrogenation are especially noteworthy.

The use of an iron catalyst to selectively remove nitrogen from hydrocarbon mixtures, as per this invention, shows a lower hydrogen consumption rate than normal hydrodenitrogenation processing as is now practiced. This was shown by analysis. Thus, two samples of product from the first stage run were examined for hydrogen content, as compared to the original feed, by the technique of wide-line NMR analysis, a practice commonly accepted in the industry.

The following example illustrates the potential savings resulting from lower hydrogen consumption when staging the denitrogenation process first through conventional hydrotreating (such as $NiMo/Al_2O_3$ catalyst) followed with a nitrogen removal finishing step over an iron-based catalyst as per this invention.

EXAMPLE 22

The data given in Table XIV show the potential hydrogen consumption required to treat the 400°-650° F. (204.5° C.-343.3° C.) Colorado shale oil fraction (Example 21) to reduce the nitrogen level of the original feed from 2200 ppm nitrogen to 430 ppm nitrogen, and to 500 ppm nitrogen over a fused iron catalyst as described herein. These figures given in Table XIV which are representative of potential hydrogen consumption, viz., 60 SCF/B and 56 SCF/B, respectively, are based on the assumption that nitrogen is removed via two carbon-nitrogen bond cleavages for a total consumption of four atoms of hydrogen for each atom of nitrogen removed from a molecule.

TABLE XIV

Hydrogen Consumption During The Removal of Nitrogen From A 400–650° C. (204.5° C.-343.3° C.) Colorado Shale Oil Fraction (2200 ppm N Over A Katalco 35-4 Fused Iron Catalyst)

| WPPM N | % H By NMR | Potential $H_2$ Consumption[1] | $H_2$ Consumption By Analysis |
|---|---|---|---|
| 2200 | 13.48 | — | — |
| 430 | 13.52 | 60 SCF/B | 44 SCF/B |
| 500 | 13.52 | 56 SCF/B | 44 SCF/B |

[1]Assumption: Nitrogen removal via C—N bond cleavages for a total consumption of 4H/N removed.

The actual hydrogen consumption, as shown in Table XIV, was found to be 44 SCF/B in each case. Comparable nitrogen removal utilizing conventional technology, calculated from traditionally accurate in-house hydrodenitrogenation correlations with a similar feed, would be expected to require a 100 SCF/B to 200 SCF/B consumption of hydrogen. These results clearly illustrate the expected trend of lower hydrogen consumption when the process of this invention is used for selective nitrogen removal from a representative nitrogen-containing, hydrocarbon mixture.

The following example illustrates the denitrogenation of the product of a refinery heating oil hydrofiner, a product which contained a large concentration of carbazole derivatives. Approximately 40 percent of the nitrogen, and between 40 and 50 percent of the sulfur, was removed.

EXAMPLE 23

Figure 2:
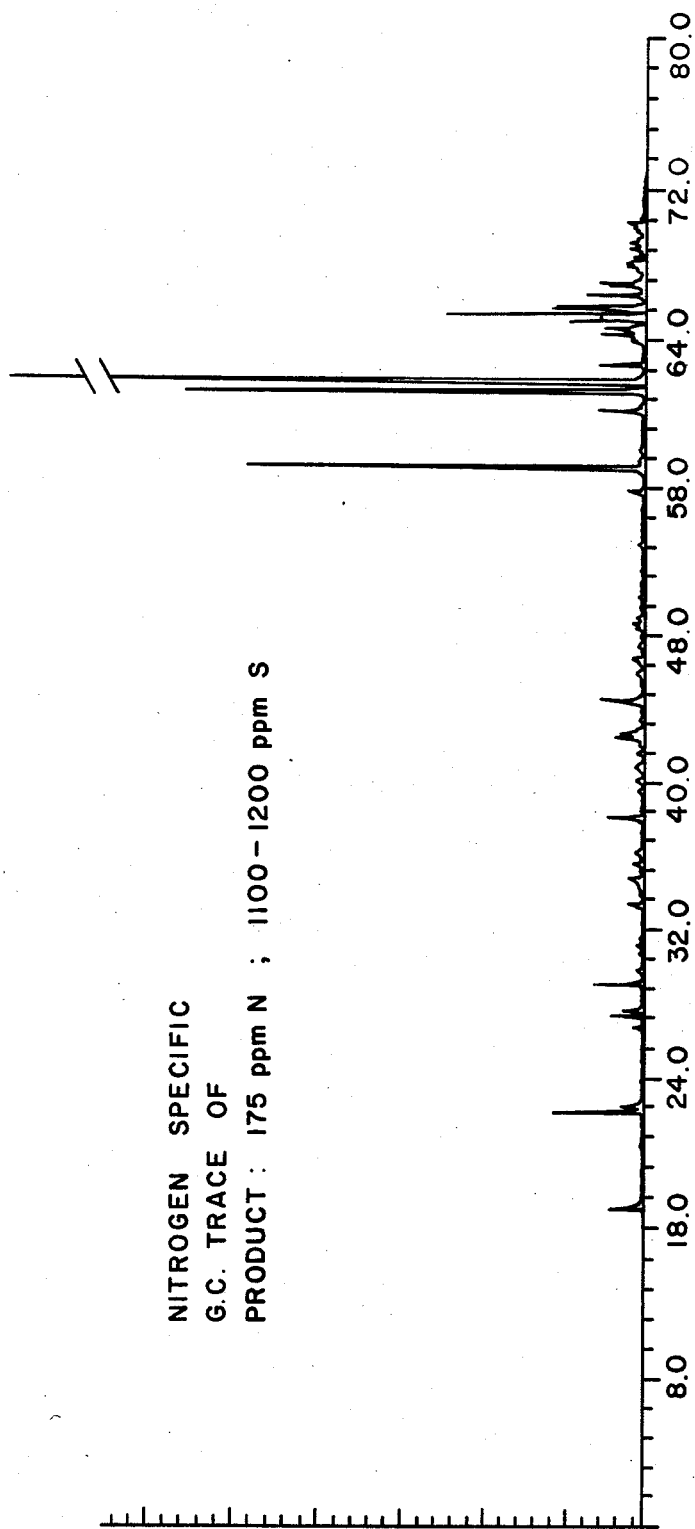

A petroleum feedstock was obtained from a typical refinery heating oil hydrofiner. This feedstock was a 350°-700° F. (176.7° C.-371° C.) boiling range material which, after being hydrofined at 310° C., 250 psig $H_2$ (total pressure 520 psig), 750 SCF/B, and LHSV=1.2, still contained about 290 ppm N and about 2200 ppm sulfur. A portion of this material was passed over a 10.0 mL, 29.1 g. portion of fused iron catalyst which was activated by contact with a 5% $NH_3/H_2$ gas blend at 470° C./2.5 hours, at the following conditions: 350° C.; 250 psig $H_2$; TGR=8000 SCF/B; and LHSV=0.4. The product sample collected between 6.73 and 10.93 hours of run time was found to contain about 175 ppm nitrogen and about 1100 ppm sulfur. This product and the feed were more carefully analyzed by gas chromatography using a nitrogen specific (thermionic specific detector) system. The data obtained are graphically depicted, for convenience, reference being made to FIGS. 1 and 2, respectively. This method of detection allowed determination as to which of the compounds eluting from the G.C. column contained nitrogen. By comparisons with known nitrogen compounds and other well-characterized materials, the general type and concentration of the nitrogen compounds in the sample were analyzed and determined. As shown in FIG. 1, the hydrofined feedstock containing 290 ppm N exhibited a cluster of nitrogen compound peaks which eluted between 58 and 72 minutes. For this type of material, this cluster of peaks is commonly referred to as the "carbazole envelope" since most of the compounds represented are derivatives of carbazole, either substituted, partially hydrogenated, or both. By comparison of FIG. 1 with FIG. 2, the latter being a similar G.C. trace showing the nitrogen compounds in the product, it can be readily seen that the number and/or concentration of many of the nitrogen compounds of the carbazole envelope have decreased. This corresponds to an observed initial decrease in nitrogen concentration from 290 ppm in the feed to about 175 ppm in the analyzed product. At the same time, however, it was observed that a significant amount of catalyst deactivation had occurred, presumably due to the high sulfur levels, with a concurrent increase in the nitrogen content of the product. This example thus clearly illustrates the ability of fused iron catalysts, as used in the practice of this invention, to denitrogenate carbazole-type compounds under the low temperature, low pressure conditions of this invention.

It is apparent that various modifications and changes can be made without departing the spirit and scope of the invention.

Having described the invention, what is claimed is:

1. A process for the denitrogenation of a feed comprising a nitrogen-containing hydrocarbon compound containing a carbon-nitrogen bond, which comprises:
   contacting said feed, in the presence of hydrogen, over a catalyst comprised of elemental iron and one or more alkali or alkaline-earth metals components at a temperature ranging from about 225° C. to about 430° C. and hydrogen partial pressure ranging from about 0 psig to about 1000 psig sufficient to cleave the carbon-nitrogen bond of said nitrogen-containing hydrocarbon compound and denitrogenate said nitrogen-containing hydrocarbon compound.

2. The process of claim 1 wherein the feed is comprised of a mixture of hydrocarbon compounds, inclusive of one or more of said nitrogen-containing hydrocarbon compounds.

3. The process of claim 1 wherein the nitrogen-containing hydrocarbon compound comprises an aromatic heterocyclic nitrogen hydrocarbon containing at least one aryl carbon-nitrogen bond.

4. The process of claim 1 wherein the nitrogen-containing hydrocarbon compound is a molecule characterized by the presence of a nitrogen atom bound via a single carbon-nitrogen bond to a nuclear carbon atom of a non-nitrogen containing aryl or aromatic ring.

5. The process of any of claims 1, 2, 3, or 4 wherein the reaction is conducted at temperature ranging from about 250° C. to about 400° C. and at hydrogen partial pressure ranging from about 0 psig to about 600 psig.

6. The process of any of claims 1, 2, 3, or 4 wherein the reaction is conducted at temperature ranging from about 300° C. to about 370° C. and at hydrogen partial pressure ranging from about 0 psig to about 600 psig.

7. The process of any one of claims 1, 2, 3, or 4 wherein the iron catalyst is a bulk iron catalyst and contains from about 70 percent to about 98 percent elemental iron.

8. The process of any one of claims 1, 2, 3, or 4 wherein the iron catalyst is one wherein the iron is dispersed upon a support, and contains from about 70 percent to about 98 percent iron, exclusive of the support component, or components.

9. The process of any one of claims 1, 2, 3, or 4 wherein the feed is reacted over a bulk iron catalyst which contains one or more alkali or alkaline-earth metals in concentrations ranging from about 0.01 percent to about 10 percent, and a Group III metal in concentration ranging from about 0.01 percent to about 20 percent.

10. The process of any one of claims 1, 2, 3, or 4 wherein the feed is reacted over an iron catalyst wherein the iron is dispersed upon an inorganic oxide support, the iron contains one or more alkali or alkaline-earth metals in concentration ranging from about 0.01 percent to about 10 percent, and aluminum in concentration ranging from about 0.01 percent to about 20 percent.

11. A process for the denitrogenation of a feed comprising a nitrogen-containing hydrocarbon compound containing a carbon-nitrogen bond, which comprises:
   contacting said feed, in the presence of hydrogen, over
   (i) a bulk iron catalyst which contains at least 50 percent elemental iron, based on the weight of the catalyst, and one or more alkali or alkaline-earth metals, or
   (ii) an iron catalyst wherein the iron is dispersed upon an inorganic oxide support, the catalyst containing at least about 0.1 percent iron, based on the total weight of the catalyst, the supported metallic component containing at least 50 percent iron, exclusive of the support component, or components, of the catalyst, and one or more alkali or alkaline-earth metals,
   at a temperature ranging from about 225° C. to about 430° C. and hydrogen partial pressure ranging from about 0 psig to about 1000 psig sufficient to cleave the carbon-nitrogen bond of said nitrogen-containing hydrocarbon compound and denitrogenate said nitrogen-containing hydrocarbon compound.

12. The process of claim 1 wherein the feed is comprised of a mixture of hydrocarbon compounds, inclusive of one or more of said nitrogen-containing hydrocarbon compounds.

13. The process of claim 11 wherein the nitrogen-containing hydrocarbon compound comprises an aromatic heterocyclic nitrogen-containing hydrocarbon containing at least one aryl carbon-nitrogen bond.

14. The process of claim 11 wherein the nitrogen-containing hydrocarbon compound is a molecule characterized by the presence of a nitrogen atom bound via a single carbon-nitrogen bond to a nuclear carbon atom of a non-nitrogen containing aryl or aromatic ring.

15. The process of any of claims 11, 12, 13, or 14 wherein the reaction is conducted at temperature ranging from about 250° C. to about 400° C. and at hydrogen partial pressure ranging from about 0 psig to about 600 psig.

16. The process of any of claims 11, 12, 13, or 14 wherein the reaction is conducted at temperature ranging from about 300° C. to about 370° C. and at hydrogen partial pressure ranging from about 0 psig to about 600 psig.

17. The process of any one of claims 11, 12, 13, or 14 wherein the iron catalyst is a bulk iron catalyst which contains from about 70 percent to about 98 percent elemental iron.

18. The process of any one of claims 11, 12, 13, or 14 wherein the iron catalyst is one wherein the iron is dispersed upon a support, and contains from about 70 percent to about 98 percent iron, exclusive of the support component, or components.

19. The process of any one of claims 11, 12, 13, or 14 wherein the feed is reacted over a bulk iron catalyst which contains one or more alkali or alkaline-earth metals in concentrations ranging from about 0.01 percent to about 10 percent, and a Group III metal in concentration ranging from about 0.01 percent to about 20 percent.

20. The process of any one of claims 11, 12, 13, or 14 wherein the feed is reacted over an iron catalyst wherein the iron is dispersed upon an inorganic oxide support, and the iron contains one or more alkali or alkaline-earth metals in concentration ranging from about 0.01 percent to about 10 percent, and aluminum in concentration ranging from about 0.01 percent to about 20 percent.

21. A process for the selective denitrogenation of a feed comprising an admixture of hydrocarbon compounds at least one of which is characterized as an aromatic nitrogen-containing hydrocarbon compound having at least one aromatic ring bonded via a ring carbon atom to a nitrogen atom which comprises: contacting said feed, in the presence of hydrogen, over (i) a bulk iron catalyst which contains at least 50 percent elemental iron, based on the weight of the catalyst, and one or more alkali or alkaline-earth metals, or (ii) an iron catalyst wherein the iron is dispersed upon an inorganic oxide support, the catalyst containing at least about 0.1 percent iron, based on the total weight of the catalyst, the supported metallic component containing at least 50 percent iron, exclusive of the support component, or components, of the catalyst, and one or more alkali or alkaline-earth metals, at a temperature ranging from about 225° C. to about 430° C. and hydrogen partial pressure ranging from about 0 psig to about 1000 psig sufficient to cleave said aryl carbon-nitrogen bond of said nitrogen-containing aromatic hydrocarbon compound to produce a product wherein at least about 50 percent of the nitrogen removed from the parent aromatic nitrogen-containing hydrocarbon compound is the result of denitrogenation via cleavage of said aryl carbon-nitrogen bond, with separation of the nitrogen from the molecule and healing with hydrogen of the carbon site from which the nitrogen was cleaved, without hydrogen saturation of the aromatic ring to which the nitrogen atom of the nitrogen-containing parent compound was bonded via a nuclear carbon atom.

22. The process of claim 21 wherein at least about 75 percent of the nitrogen is removed from the parent aromatic nitrogen-containing hydrocarbon compound as the result of denitrogenation via cleavage of said aryl carbon-nitrogen bond, with separation of the nitrogen from the molecule and healing with hydrogen of the carbon site from which the nitrogen was cleaved, without hydrogen saturation of the aromatic ring to which the nitrogen atom of the nitrogen-containing parent compound was bonded via a nuclear carbon atom.

23. The process of claim 21 wherein from about 90 percent to about 100 percent of the nitrogen is removed from the parent aromatic nitrogen-containing hydrocarbon compound as the result of denitrogenation via cleavage of said aryl carbon-nitrogen bond, with separation of the nitrogen from the molecule and healing with hydrogen of the carbon site from which the nitrogen was cleaved, without hydrogen saturation of the aromatic ring to which the nitrogen atom of the nitrogen-containing parent compound was bonded via a nuclear carbon atom.

24. The process of any of claims 21, 22, or 23 wherein the reaction is conducted at temperature ranging from about 250° C. to about 400° C. and at hydrogen partial pressures ranging from about 0 psig to about 600 psig.

25. The process of any of claims 21, 22, or 23 wherein the reaction is conducted at temperature ranging from about 300° C. to about 370° C. and at hydrogen partial pressures ranging from about 0 psig to about 400 psig.

26. The process of any of claims 21, 22, or 23 wherein the feed is reacted over a bulk iron catalyst, the catalyst is formed by fusion of the iron with one or more alkali or alkaline-earth metals in concentrations ranging from about 0.01 percent to about 10 percent, and a Group III metal in concentration ranging from about 0.01 percent to about 20 percent.

27. The process of any of claims 21, 22, or 23 wherein the feed is reacted over an iron catalyst wherein the iron is dispersed upon an inorganic oxide support, the iron contains one or more alkali or alkaline-earth metals in concentration ranging from about 0.1 percent to about 10 percent, and aluminum in concentration ranging from about 0.01 percent to about 20 percent.

* * * * *